United States Patent
Hoblit et al.

(10) Patent No.: US 8,391,445 B2
(45) Date of Patent: Mar. 5, 2013

(54) CALLER IDENTIFICATION USING VOICE RECOGNITION

(75) Inventors: Robert S. Hoblit, Raleigh, NC (US);
Karen Waluk, Raleigh, NC (US);
Thomas Prorock, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 12/268,132

(22) Filed: Nov. 10, 2008

(65) Prior Publication Data
US 2010/0119046 A1    May 13, 2010

(51) Int. Cl.
H04M 1/64    (2006.01)

(52) U.S. Cl. .......... 379/88.02; 370/352; 379/142.05; 379/142.06; 704/270; 709/228

(58) Field of Classification Search ........... 370/351–356, 370/259–271; 379/67.1–88.28, 142.01–142.18, 379/201.01, 201.11, 207.13–208.01, 67.01, 379/93.07, 93.26–93.34, 110.01, 156–166, 379/167.08, 216.01–218.02, 372–373.04, 379/387.01–388.07, 419, 430, 431; 704/270–278; 455/403–420, 426.2, 456.1–466, 550.1–560, 455/412.1–420, 426.1, 461–466; 709/201–207, 709/211–248
See application file for complete search history.

(56) References Cited

U.S. PATENT DOCUMENTS

| | | | | |
|---|---|---|---|---|
| 5,892,813 A * | 4/1999 | Morin et al. | ............... | 379/88.01 |
| 6,122,357 A * | 9/2000 | Farris et al. | .............. | 379/207.02 |
| 6,195,568 B1 * | 2/2001 | Irvin | ............................. | 455/563 |
| 6,327,347 B1 * | 12/2001 | Gutzmann | ................. | 379/88.02 |
| 6,373,925 B1 * | 4/2002 | Guercio et al. | ................. | 379/82 |
| 6,438,520 B1 * | 8/2002 | Curt et al. | ..................... | 704/254 |
| 6,459,776 B1 * | 10/2002 | Aktas et al. | ................ | 379/88.13 |
| 6,718,021 B2 * | 4/2004 | Crockett et al. | ........... | 379/93.23 |
| 7,003,466 B2 * | 2/2006 | Brown et al. | ................. | 704/275 |
| 7,006,605 B1 * | 2/2006 | Morganstein et al. | ..... | 379/88.02 |
| 7,027,566 B2 * | 4/2006 | Bossemeyer et al. | ...... | 379/88.02 |
| 7,035,386 B1 * | 4/2006 | Susen et al. | ................ | 379/93.02 |
| 7,035,388 B2 * | 4/2006 | Kurosaki | ................. | 379/142.06 |
| 7,072,686 B1 * | 7/2006 | Schrager | .................... | 455/556.1 |
| 7,174,163 B2 * | 2/2007 | Aksu et al. | ................. | 455/414.1 |
| 7,231,019 B2 | 6/2007 | Pascovici | | |
| 7,483,520 B2 * | 1/2009 | Han et al. | ................... | 379/88.03 |
| 7,511,603 B2 * | 3/2009 | Hellebust et al. | ............ | 340/7.5 |
| 7,813,482 B2 * | 10/2010 | Girouard et al. | .......... | 379/88.09 |
| 7,920,680 B2 * | 4/2011 | Saha et al. | ................. | 379/88.02 |
| 2002/0067825 A1 * | 6/2002 | Baranowski et al. | ......... | 379/430 |
| 2002/0104025 A1 * | 8/2002 | Wrench, Jr. | ................... | 713/202 |
| 2004/0066916 A1 * | 4/2004 | Brown et al. | .............. | 379/88.01 |

(Continued)

*Primary Examiner* — Hemant Patel
(74) *Attorney, Agent, or Firm* — Thomas Tyson; Jeffrey L. Streets (57) ABSTRACT

Methods, apparatus and computer program products for automatically identifying a calling party using voice recognition. Voice recognition is the computing task of identifying or validating a person's identity using characteristics of their voice. A first voice record is obtained from an identifiable party and associated with a voice identifier. When a second voice record is received from a calling party, the voice in the second voice record is compared to the voice in the first voice record to determine the identity of the calling party. If the there is a match between the voice in the second voice record and the voice in the previously obtained first voice record, then the called party is notified of the identity of the calling party. A voice identifier, when available, is preferably displayed to the called party on a screen instead of caller ID information.

18 Claims, 8 Drawing Sheets

U.S. PATENT DOCUMENTS

| | | | |
|---|---|---|---|
| 2005/0105699 A1* | 5/2005 | Ueyama | 379/88.19 |
| 2005/0113113 A1* | 5/2005 | Reed | 455/456.3 |
| 2006/0183513 A1* | 8/2006 | Slamka et al. | 455/575.1 |
| 2006/0285668 A1* | 12/2006 | Benco et al. | 379/157 |
| 2006/0286969 A1* | 12/2006 | Talmor et al. | 455/415 |
| 2007/0036136 A1* | 2/2007 | Barclay et al. | 370/352 |
| 2007/0167162 A1* | 7/2007 | Kim et al. | 455/435.1 |
| 2008/0317219 A1* | 12/2008 | Manzardo | 379/88.01 |
| 2010/0054433 A1* | 3/2010 | Gustave et al. | 379/88.23 |
| 2010/0088100 A1* | 4/2010 | Lindahl | 704/270.1 |

* cited by examiner

CALLER IDENTIFICATION USING VOICE RECOGNITION

BACKGROUND OF THE INVENTION

1. Field of the Invention

The present invention relates to systems and methods for providing caller identification information to a called party.

2. Background of the Related Art

According to the online dictionary Wikipedia.com, caller ID (caller identification, CID, or more properly calling number identification) is a telephone service, available on plain old telephone service (POTS) lines, that transmits a caller's number to the called party's telephone equipment during the ringing signal, or when the call is being set up but before the call is answered. Where available, caller ID can also provide a name associated with the calling telephone number, for a higher fee. The information made available to the called party may be made visible on a telephone's own display or on a separate attached device.

Caller ID may be used to track down or limit the impact of prank calls, telemarketers, and other intrusions. However, it can also impede communication by enabling users to become evasive. The concept behind caller ID is the value of informed consent. However, caller ID may also raise issues about personal privacy or facilitate caller ID spoofing.

Caller ID is made up of two separate pieces of information: the calling number and the billing (or subscriber) name where available. When an originating phone switch sends out a phone number as caller ID, the telephone company receiving the call is responsible for looking up the name of the subscriber in a database. To look up the name associated with a phone number, the carrier in some instances has to access that information from a third party database and some database providers charge a small fee for each access to such databases. To avoid such charges, some carriers will report the name as unavailable, or will report the name as "(city), (state)" based on the phone number. For 800 numbers, they may report a string such as "TOLLFREE NUMBER" if the name is not available in a database.

What is displayed as caller ID also depends on the equipment originating the call. If the call originates on a POTS line (a standard loop start line), caller ID is provided by the service provider's local switch. Since the network does not connect the caller (i.e., the calling party) to the callee (i.e., the called party) until the phone is answered, generally the caller ID signal cannot be altered by the caller. Most service providers however, allow the caller to block caller ID presentation through the vertical service code *67. A call placed from behind a private branch exchange (PBX) has more options. In the typical telephony environment, a PBX connects to the local service provider through PRI trunks. Generally, although not absolutely, the service provider simply passes whatever calling line ID appears on those PRI access trunks transparently across the Public Switched Telephone Network (PSTN). This opens up the opportunity for the PBX administrator to program whatever number they choose in their external phone number fields.

Still further, internet protocol (IP) phone services support PSTN gateway installations throughout the world. These gateways egress calls to the local calling area, thus avoiding long distance toll charges (a key feature of IP services). IP phone services also allow a local user to have a number located in a foreign exchange, such as a New York caller could have a Los Angeles telephone number. When that user places a call, the calling line ID would be that of a Los Angeles number although they are actually located in New York.

With cell phones, there are issues with passing calling line ID information through the network. Cell phone companies must support interconnecting trunks to a significant number of wireline and PSTN access carriers. In order to save money, cell phone carriers may not purchase the North American feature Group D or PRI trunks required to pass calling line ID information across the network.

In the United States, caller ID information is sent to the called party by the telephone switch as an analog data stream (similar to data passed between two modems), between the first and second rings, while the telephone unit is still on the hook. If the telephone call is answered before the second ring, caller ID information will not be transmitted to the recipient.

BRIEF SUMMARY OF THE INVENTION

One embodiment of the present invention provides a method for automatically identifying a calling party. A first voice record is obtained from an identifiable party and associated with a voice identifier. When a second voice record is received from a calling party, the voice in the second voice record is compared to the voice in the first voice record to determine the identity of the calling party. If the there is a match between the voice in the second voice record and the voice in the first voice record, then the called party is notified of the identity of the calling party.

Another embodiment of the present invention provides a computer program product including computer usable program code embodied on a computer usable medium for automatically identifying a calling party. The computer program product includes computer usable program code for storing a first voice message in association with a voice identifier, computer usable program code for comparing the voice in a second voice message with the voice in the first voice message to determine the identity of party in the second voice message, and computer usable program code for notifying the called party of the identity of the calling party.

DETAILED DESCRIPTION OF THE INVENTION

One embodiment of the present invention provides methods and computer program products for automatically identifying a calling party using voice recognition. Voice recognition is the computing task of identifying or validating a person's identity using characteristics of their voice. Voice recognition typically relies upon acoustic features of speech that have been found to differ between individuals. For example, these acoustic features or patterns may reflect anatomy (e.g., size and shape of the throat and mouth) as well as learned behavioral patterns (e.g., voice pitch, speaking style). Voice recognition may be considered to be a behavioral biometric. Voice recognition should not be confused with speech recognition, which is the computing task of recognizing the substance of what is being said.

One embodiment of the invention provides a method for automatically identifying a calling party. A first voice record is obtained from an identifiable party and associated with a voice identifier. When a second voice record is received from a calling party, the voice in the second voice record is compared to the voice in the first voice record to determine the identity of the calling party. If the there is a match between the voice in the second voice record and the voice in the first voice record, then the called party is notified of the identity of the calling party.

The first voice record may be obtained by a telephony device, such as by having the identifiable person speak directly into a microphone associated with the device. Furthermore, the first voice record may be obtained by accessing at least a portion of an existing voice mail message or receiving a call accompanied by a voice record. According to any of the foregoing methods, a user of a telephony device may train the device to recognize the voice of one or more people. A collection of voice recognition records is stored in memory and associated with a voice identifier. The voice identifier for a given voice recognition record may be the person's name, the person's image, or any other output that the user wants. Typical output is selected from text and images on a display screen and audio played through a speaker.

In one embodiment, the task of associating the first voice sample with a voice identifier includes the user entering and saving the voice identifier in the same voice recognition record as the first voice sample. Suitably, a textual voice identifier may be entered by typing, an image voice identifier may entered by taking a picture of the person, and an audio voice identifier may be entered either by recording a sound (such as the person's name or a portion of the person's favorite song) or selected from a collection of pre-recorded sounds. The voice recognition record may optionally also include a telephone number that is assigned to the person's primary telephony device.

When a second voice sample is received from a calling party, the voice in the second voice sample is compared to the voice in the first voice sample to determine the identity of the calling party. The second voice sample is preferably either a voice mail message or a voice sample accompanying the initial call signal (i.e., a real-time call). For example, the second voice sample may be at least a portion of a voice activation command that the calling party uttered to initiate a call to the called party. It is believed that accuracy and confidence in comparing and matching voice samples will be the greatest where both the first voice sample (used to form a voice recognition record for the person) and the second voice sample (accompanying a call) are voice activation commands. This eliminates variations in wording that may complicate the comparison.

The use of voice recognition allows the calling party to be identified by their voice. By contrast, existing caller ID systems simply identify the telephony device that was used to initiate the call. Accordingly, voice recognition can distinguish between multiple persons using the same telephone device or telephony system, and may also be able to identify a person without regard to existing caller ID services.

If there is a match between the voice in the second voice sample and the voice in the first voice sample, then the called party is notified of the identity of the calling party. The manner of comparing and the criteria for determining a match are considered to be within the level of ordinary skill in the art of voice recognition. For example, and without limitation, the step of comparing may include the use of frequency estimation, hidden Markov models, Gaussian mixture models, pattern matching algorithms, neural networks, matrix representation or decisions trees. However, the identity of the calling party is output to the user.

It is possible that the call will be accompanied by caller identification (caller ID) information, which is typically supplied by an intermediate telephone service provider. This caller ID information may include the caller telephone number and/or the caller's name. Optionally, this information may be output to the telephony device of the called person along with, or in the absence of, any voice identifier determined by voice recognition. However, a voice identifier associated with a matching voice sample is considered to provide a more reliable and more specific identification of the person placing the call, and a voice identifier is preferably used to replace or supplement caller ID whenever available.

In another embodiment, caller ID information is used to index the voice recognition records. In other words, the voice recognition records are searched to locate any voice recognition record(s) that includes the caller ID information, such as the same telephone number. When there is a voice recognition record associated with, for example, a telephone number that matches the telephone number in the caller ID information, then that record is more likely to contain a matching voice sample than the other records. Accordingly, the comparison of voice samples should begin with this identified record. If the voice samples match, then the comparison of other voice records may be avoided. However, the voice sample comparisons continue until either a match is found or all records have been analyzed. In this manner, voice recognition can identify a person calling regardless of whether that person is calling from their primary telephone number (associated with a voice recognition record) or calling from a telephone number that has never been used before.

In yet another embodiment, two or more of the voice recognition records have with a common calling party identifier, such as a telephone number, yet are associated with distinct voice samples. This embodiment is particularly useful when multiple users share a telephony device, which could be a single cellular telephone or a PBX network of telephones.

In a still further embodiment, the second voice sample is part of a voice mail message and the step of notifying includes displaying a list of voice messages in a voice mail inbox and the identity of the calling party associated with each of the listed voice messages.

It should be recognized that invention may be implemented in one or more telephony devices. Specifically, a cellular telephone may include both a voice recognition module and one or more voice recognition records. This cellular telephone might also include voicemail records, but it is presently more likely that the content of any voicemail messages will reside on a voicemail server separate from the telephone. Still, embodiments identifying a calling person by a sample of a voice activation command do not require a voicemail system. Conversely, certain embodiments of the invention may be fully implemented in a voicemail server by incorporating the voicemail records, voice recognition module and one or more voice recognition records. For example, in cases where there is a web based access to the voice mail (such as the IBM Unified Messaging System), the web interface could include the voice identifier in the list of messages and also include this information in an email notification (rather than merely providing a generic notice like "Voice Message Left by External Caller").

In yet another embodiment, a first voice sample that is used to establish a voice recognition record includes only an initial greeting portion of a voice mail message. Because a person may make repetitive use of a similar greeting (i.e., "Hi, this is Bob"), this portion of a voicemail message is ideal for voice recognition techniques based on pattern matching. As many callers are consistent in the beginning of their voice mail messages, this will ensure a high confidence on future matches. When a voice mail is left by a caller, the voice mail (and possibly the source number) is pattern matched against the database and if a match is made, the voice identifier can be output.

It should be recognized that certain embodiments of the invention do not require the calling party to take extra steps to input information or alter their calling habits. Accordingly, certain embodiments of the invention, such as a voice mail system, may be fully implemented in equipment or software of the called party. Embodiments in which the telephony device of the calling party transmits at least a portion of a voice command also do not require the calling party to modify their calling habits, although their telephony device must include the capability to capture and transmit the voice command with the call.

Another embodiment of the present invention provides a computer program product including computer usable program code embodied on a computer usable medium for automatically identifying a calling party. The computer program product includes computer usable program code for storing a first voice message in association with a voice identifier, computer usable program code for comparing the voice in a second voice message with the voice in the first voice message to determine the identity of party in the second voice message, and computer usable program code for notifying the called party of the identity of the calling party. Furthermore, the computer program product may include computer usable program code for carrying out any of the method steps discussed herein.

A still further embodiment of the invention includes a telephony device, such as a telephone or computer. A preferred telephony device comprises a microphone for receiving voice input, an output device for automatically communicating the identity of the calling party to a called party, a speech recognition module for identifying an instruction contained in the voice input, a voice recognition module for analyzing voice samples to determine the identity of a person that uttered the voice command, and a transceiver for transmitting and receiving communications with another telephony device over a network.

Optionally, the voice recognition module may reside on the called device to analyze voice data received over the transceiver from a calling party to determine the identity of the calling party. Alternatively, the voice recognition module may reside on the calling device to analyze voice input received through the microphone from a person and the device may transmit the person's identity to another telephony device during initiation of a call to that telephony device.

An even further embodiment of the invention provides a communication system for identifying a caller. A first telephony device includes, for example, a microphone for receiving a voice command uttered by a calling party, a component for recording at least a portion of the voice command, and a speech recognition module for determining that the calling party is instructing the first telephony device to place a call to a second telephony device. A voice recognition module is provided to analyze the recording to determine the identity of the calling party that uttered the voice command. A second telephony device includes, for example, an output device for communicating the identity of the calling party to a called party. A communication network is used to establish communication between the first telephony device and the second telephony device. Any number of telephony devices may work in accordance with the embodiments of the invention, and the communication network may include multiple interconnected sub-networks.

Figure 1:
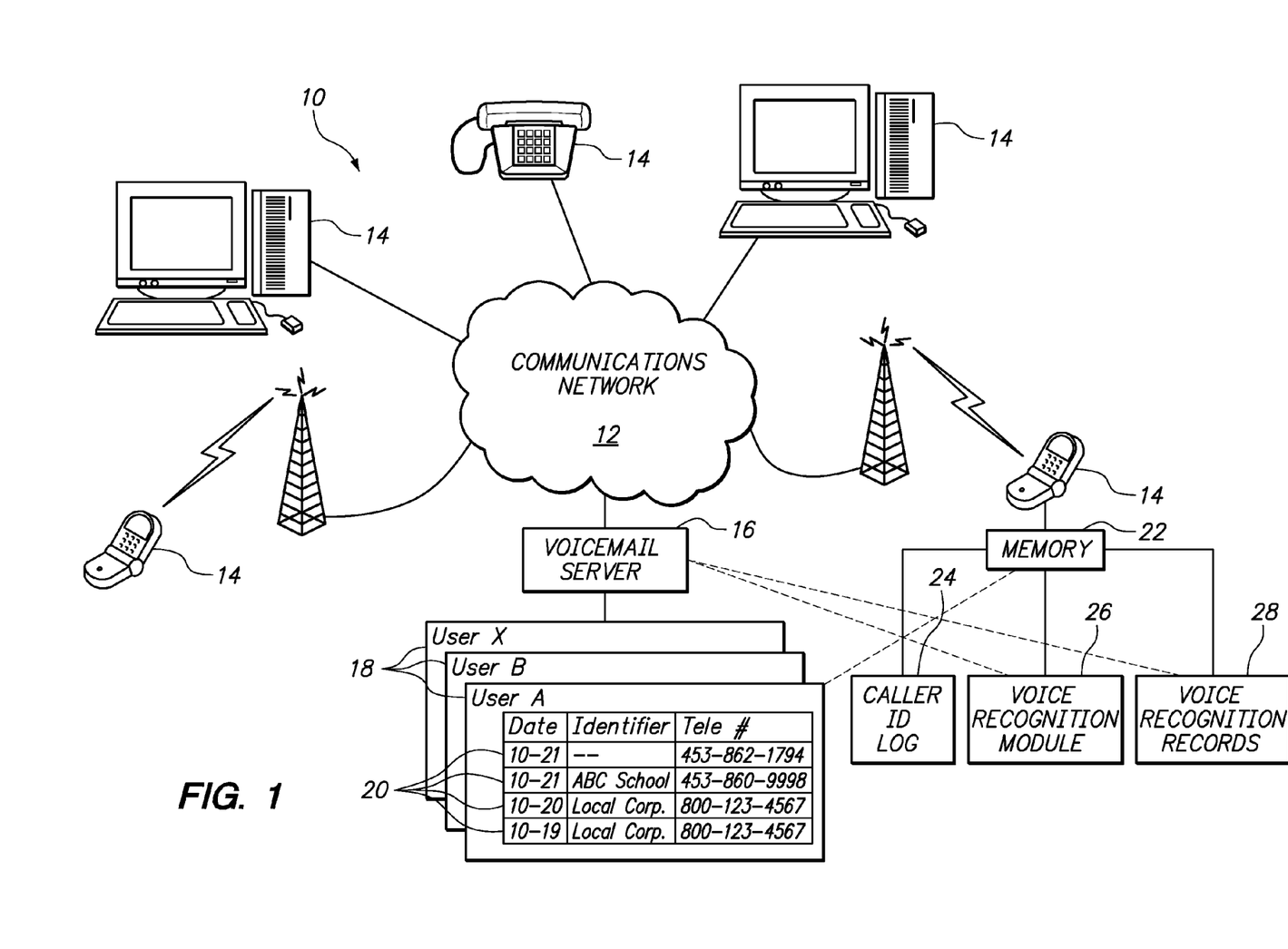
FIG. 1 is a diagram of a communications system.

FIG. 1 is a diagram of a communications system 10. The system includes a communications network 12 and a plurality of individual telephony devices 14. An optional voicemail server 16 is in communication with the network and accessible to any of the telephony devices 14 that have a voicemail account 18. In this embodiment, each voicemail account 18 is shown as maintaining a listing of voicemail messages 20 (one for each row in the listing), which are labeled by date, caller identifier and caller telephone number. Also in this embodiment, one of the telephony devices 14 shows detail of its memory 22, which includes a caller ID log 24, a voice recognition module 26, and voice recognition records 28. The dashed lines in the figure indicate that various embodiments or features may cause access or communication between components, or that in other embodiments the components may interconnected differently. However, the diagram is intended to show one arrangement of components that may perform the invention.

Figure 2:
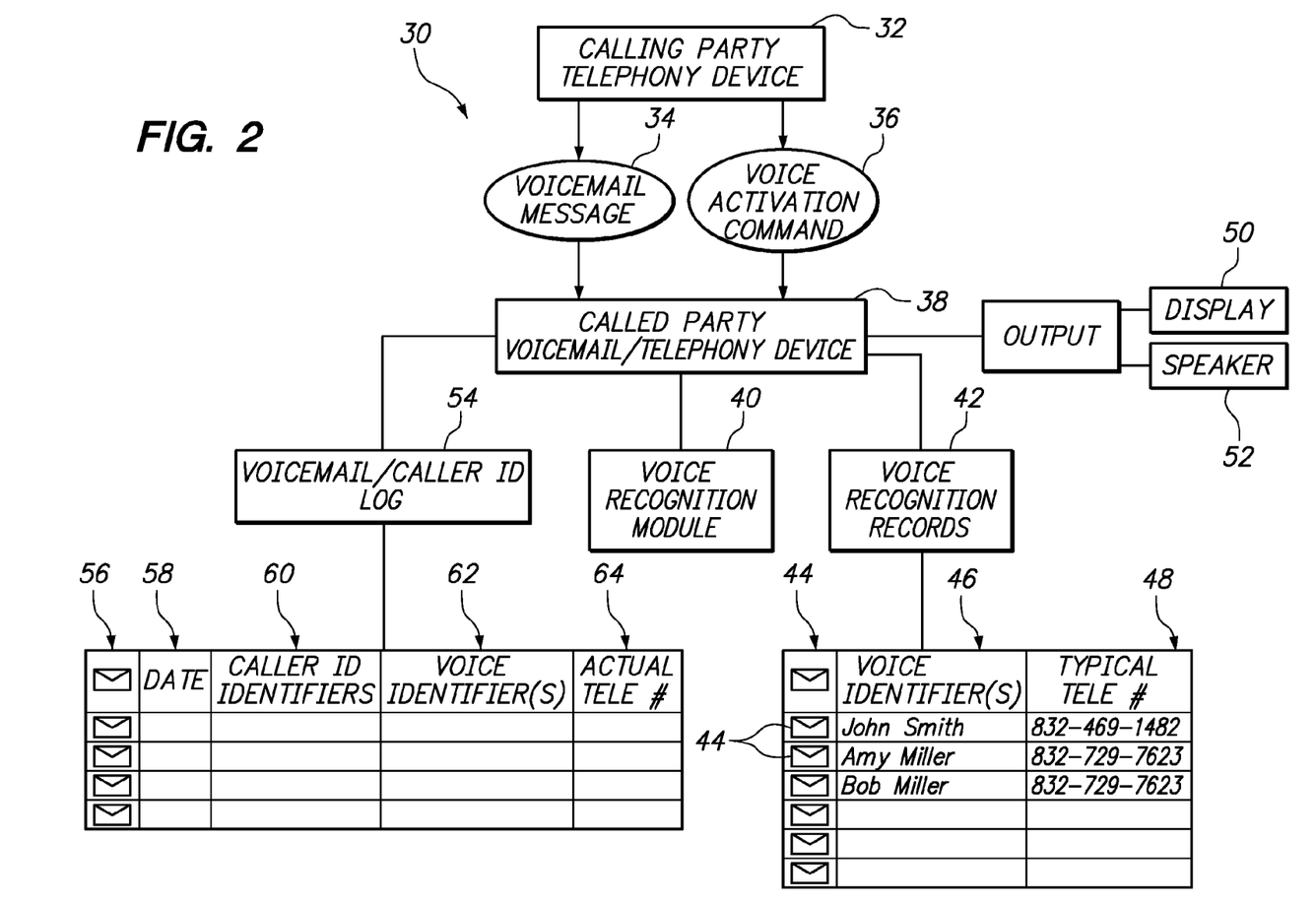
FIG. 2 is a diagram of a voice recognition system.

FIG. 2 is a diagram of a voice recognition system 30. The system includes a calling party telephony device 32 that may leave a voicemail message 34 or initiate a call including a voice activation command 36 with a called party voicemail or telephony device 38. Although in a particular system configuration, voicemail messages 34 may be routed and handled apart from the telephony device 38, these voicemail messages 34 are shown as being routed directly to the device 38 and handled by the device 38 both for simplicity and to emphasize the configurational flexibility of the components.

As shown, the called telephone device 38 includes, or has access to, a voice recognition module 40 and voice recognition records 42. The voice recognition records 42 contain voice samples (indicated by icons 44) obtained by a user of the telephony device 38 for each person that the user wants to be able to identify by voice recognition. One or more voice identifiers 46, such as the person's name, person's image, or sound file of the person's name, as well as one or more expected telephone numbers 48 are stored in association with each voice sample. In accordance with the specific voice recognition records shown, "Amy Miller" and "Bob Miller" (see column 46) share the same expected telephone number (see column 48), but a unique voice sample (see column 44) will facilitate identification of either Amy or Bob and allow output of the voice identifier 46 (either "Amy Miller" and "Bob Miller") associated with the matching voice sample. Here, all of the voice identifiers 46 are text to be shown on a display 50, but the identifiers could also be images or sounds played through a speaker 52.

An optional voicemail and/or caller ID log 54 is also included with or accessible to the telephony device 38. The log 54 includes a voicemail message (indicated by an icon in column 56), the date of the message 58, one or more caller ID identifiers 60, one or more voice identifiers 62, and the actual telephone number 64 that originated the call. The caller ID identifier 60, if any, and the actual telephone number 64, if any, are typically provided by traditional caller ID systems. The voice identifier 62, if available, is provided by the operation of the voice recognition module 40 to compare a voice sample from a voice message 34 or incoming call 36 with one or more of the voice recognition records 42. Accordingly, each message (row) of the log 54 will only include an entry in the voice identifier column 62 if there was a voice recognition record (row) 42 that matched the voice sample and provided a voice identifier 46.

Figure 3:
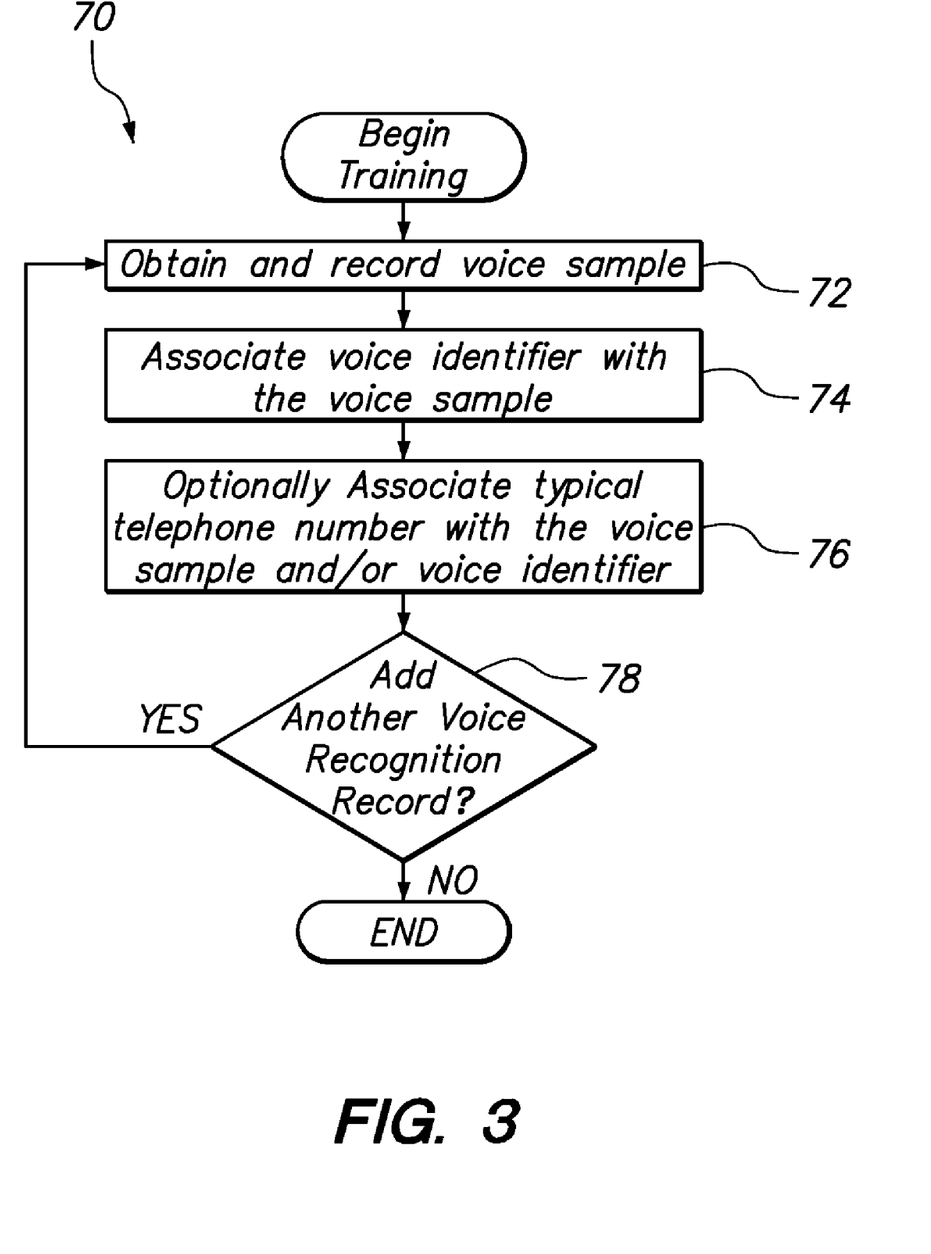
FIG. 3 is a flowchart of a process for training a voice recognition record.

FIG. 3 is a flowchart of a process 70 for training or establishing a voice recognition record (row in the records 42 of FIG. 2). A voice sample is obtained and recorded in step 72, before associating a voice identifier with the voice sample in step 74. Optionally, in step 76, one or more typical telephone number is associated with the voice sample and/or voice identifier, such that the voice sample, voice identifier and telephone number form a single voice recognition record. In step 78, if the user desires to add another voice recognition record, then the process returns to step 72. Otherwise, the process ends. Still, the training process may be run and rerun to add or delete voice recognition records at the user's discretion.

Figure 4:
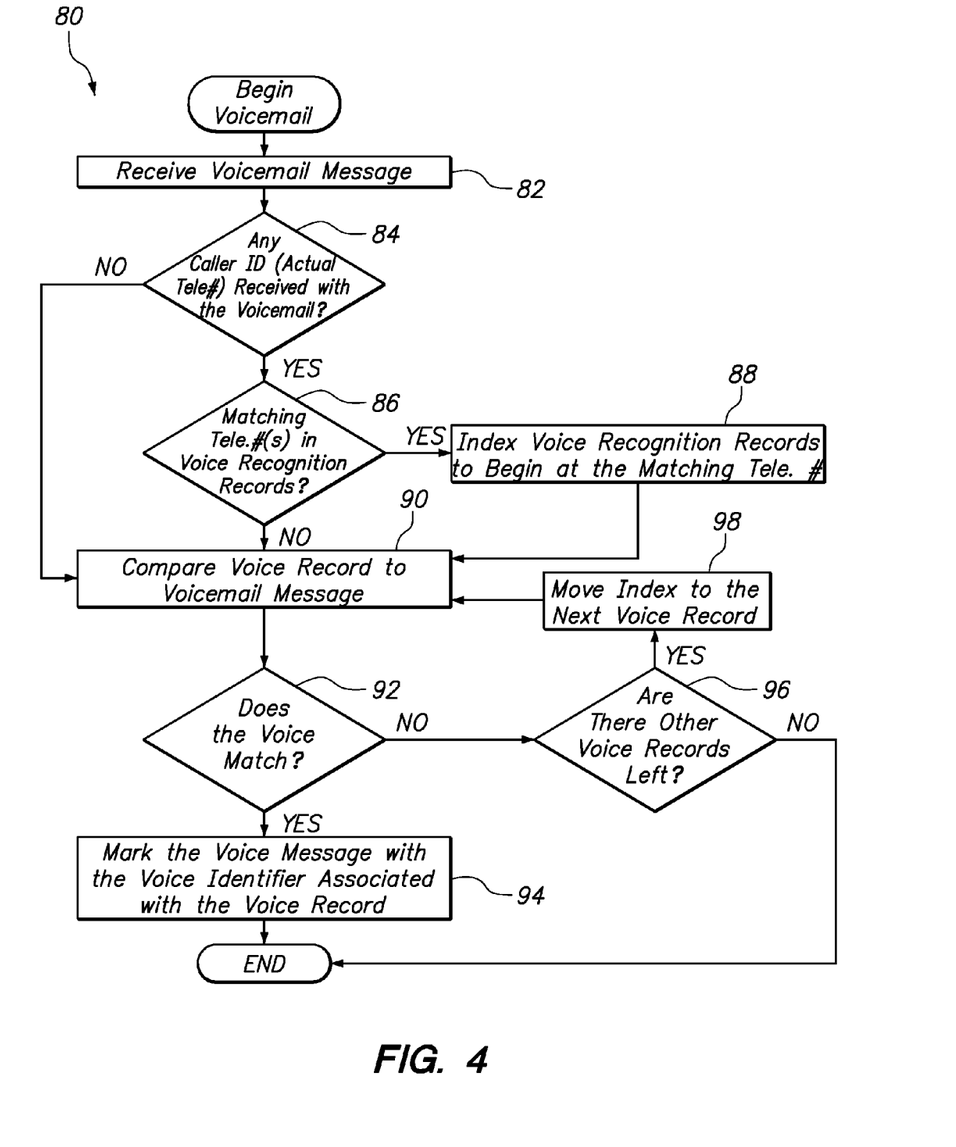
FIG. 4 is a flowchart of a process for applying voice recognition to a voicemail message.

FIG. 4 is a flowchart of a process 80 for applying voice recognition to a voicemail message that is received in step 82. If it is determined, in step 84, that there is a caller ID telephone number received with the voicemail message, then the process proceeds to step 86 to determine if the voice recognition records contain any entry with a telephone number that matches the caller ID telephone number. If the voice recognition records contain a matching telephone number, then in step 88 the voice recognition records are indexed so that the comparison of voice samples will begin with the record having the matching telephone number. After indexing in step 88, or if it is determined that no matching telephone number exists in step 86, or if no caller ID telephone number is received with the voicemail message in step 84, then in step 90 the voice sample stored in the next voice recognition record is compared to a voice sample of the voicemail message. If the voice samples are determined to match in step 92, then the voice message is marked with the voice identifier associated with the matching voice sample in step 94 and the process ends. However, if the voice samples are determined not to match in step 92, and there are other voice records left to compare in step 96, then in step 98 the index is moved to the next voice record. When it is determined, in step 96, that there are no other voice records left to compare, then the process ends. Voicemail messages may be analyzed as they are received or in a batch mode.

Figure 5:
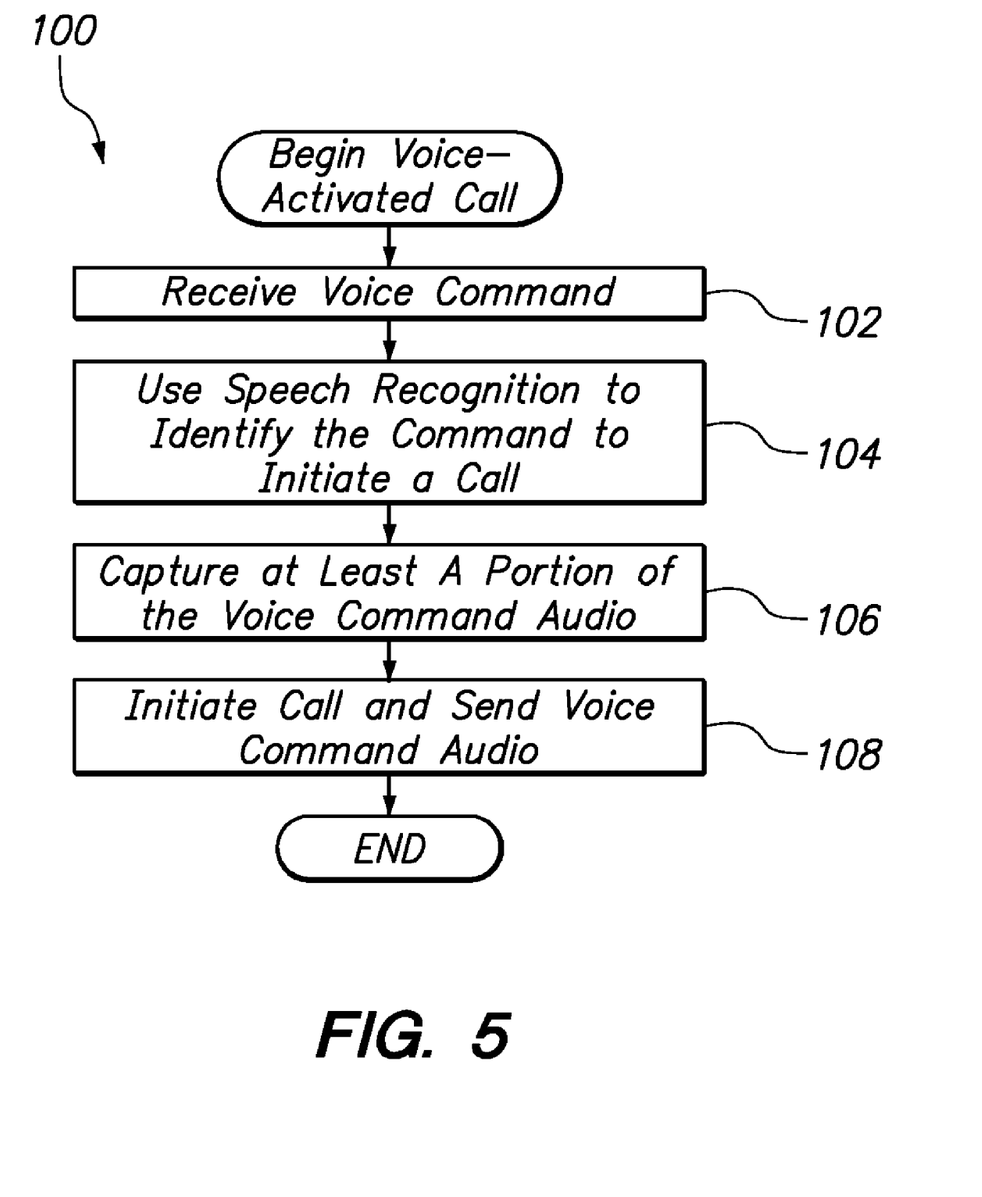
FIG. 5 is a flowchart of a process for initiating a voice-activated call.

FIG. 5 is a flowchart of a process 100 for initiating a voice-activated call. A calling party utters a predetermined voice command to allow the telephony device to receive a voice command in step 102. In step 104, a speech recognition process or algorithm is used to identify that the uttered command is instructing the device to initiate a call. Preferably, the uttered command also provides the identity of a party that should be called. In step 106, at least a portion of the voice command audio is captured by the telephony device, such as by recording the audio in flash memory. Then, the command identified by speech recognition is executed in step 108 to initiate a call and send the captured portion of the voice command to the called party. Although the call processing may continue in a normal manner, the process of capturing and sending a voice activation command ends.

Figure 6:
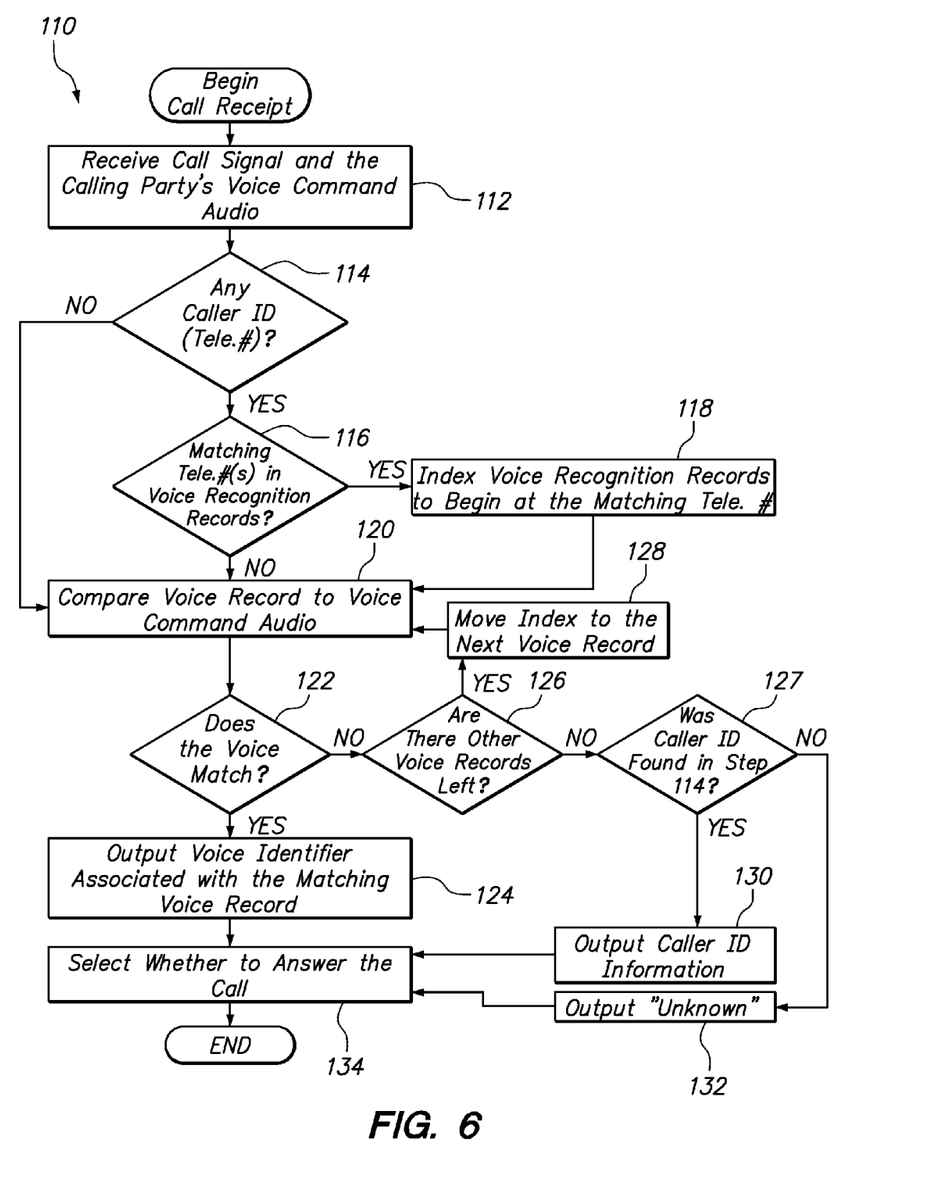
FIG. 6 is a flowchart of a process for applying voice recognition to a call including voice audio.

FIG. 6 is a flowchart of a process 110 for applying voice recognition to a call including voice audio. For example, process 110 would be executed on a called party telephony device, whereas process 100 would be executed on a calling party telephony device. In step 112, a called party telephony device receives a call signal including the calling party's voice activation command audio. If it is determined, in step 114, that the call signal includes a caller ID telephone number, then the process proceeds to step 116 to determine if the voice recognition records contain any entry with a telephone number that matches the caller ID telephone number. If the voice recognition records contain a matching telephone number, then in step 118 the voice recognition records are indexed so that the comparison of voice samples will begin with the record having the matching telephone number. After indexing in step 118, or if it is determined that no matching telephone number exists in step 116, then in step 120 the voice sample stored in the next voice recognition record is compared to a voice sample provided with the call signal. If the voice samples are determined to match in step 122, then the voice identifier associated with the matching voice record is output to the user through the telephony device in step 124. However, if the voice samples are determined not to match in step 122, and there are other voice records left to compare in step 126, then in step 128 the index is moved to the next voice record. When it is determined, in step 126, that there is no other voice records left to compare, then step 127 determines whether caller ID information was found in step 114. If caller ID information is available, then the caller ID information is output to the user through the telephony device in step 130 since a voice identifier is not available for the present call. If caller ID information is not available and no matching voice record exists in the voice recognition records, then an output such as "unknown name, unknown number" is output. The invention is most beneficial if process 110 is performed in real-time to provide the user with accurate and timely identification of the calling party.

Figure 7:
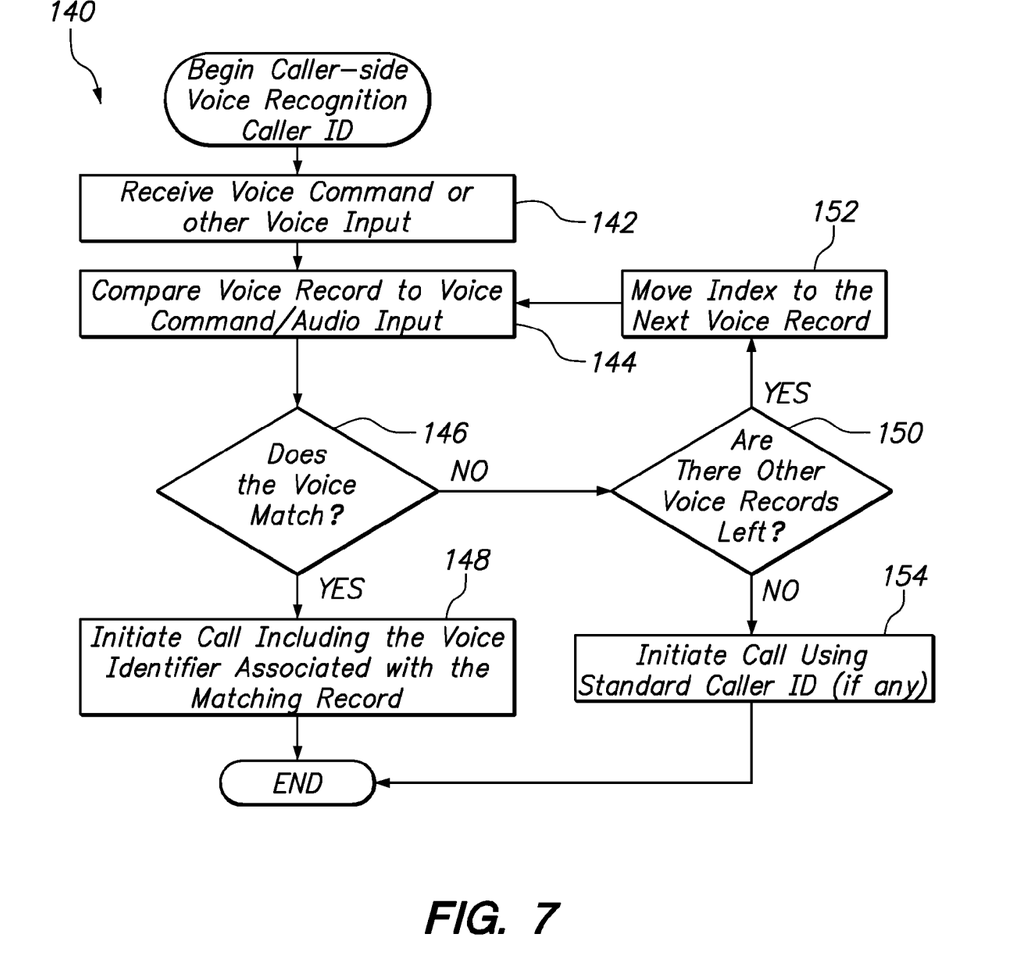
FIG. 7 is a flowchart of a process for caller-side voice recognition.

FIG. 7 is a flowchart of a process 140 for caller-side voice recognition. In order to successfully perform this process, the calling party must have previously performed a process similar to process 70 of FIG. 3 to training the calling party telephony device to recognize the voices of people that might be using the phone. In step 142, a voice command or other voice input is received, presumably through a microphone, and speech recognition is used to determine the substance of the command. In step 144, the voice command or other voice input received by the calling party's telephony device is compared against voice records previously saved in the voice recognition records. If step 146 determines that the voice sample matches one of the records, then in step 148 the call is initiated with the call signal including the voice identifier associated with the matching voice record. The called party thus receives the call with the voice identifier already included. If the voice command does not match in step 146, then the process loops through steps 150, 152 and 144 until either a match is found or there are no other voice records left to analyze. When there are no more records to analyze, the call is initiated using standard caller ID information, if available.

Figure 8:
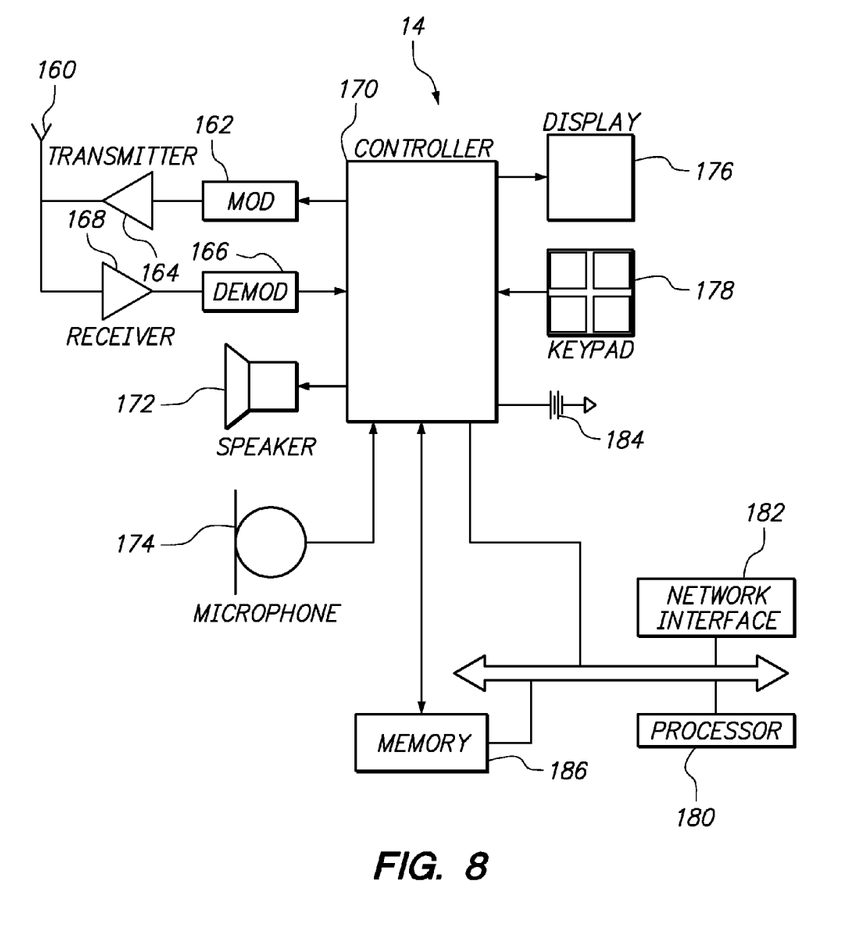
FIG. 8 is a block diagram of a typical cellular telephone.

FIG. 8 is a block diagram of a typical cellular telephone. The cellular telephone 14 includes an antenna 160 for transmitting signals to and from the communications network 12. The cellular telephone 14 includes a modulator 162, a transmitter 164, a demodulator 166, a receiver 168, and a controller 170 that provides signals to the transmitter and receives signals from the receiver. These signals include sounds (speech or music), text, images and/or computer readable files. Also connected to the controller 170 are a conventional speaker 172 and microphone 174, a display 176, and an input device, typically a keypad 178. The keypad includes numeric and alphabetic keys typically found on a telephone and other keys used for operating the cellular telephone including, but not limited to, a power button, a SEND key, and various menu scrolling and soft keys. Also included is a processor 180, a network interface 182, such as a conventional modem, a battery power source 184, and memory 186.

Although FIGS. 2 and 3 show that the memory may contain a voice recognition module, voice recognition records, and voicemail logs, the memory 186 may also store the values of various cellular system parameters and a number assignment module (NAM). Still further, the memory will typically include an operating system.

As will be appreciated by one skilled in the art, the present invention may be embodied as a system, method or computer program product. Accordingly, the present invention may take the form of entirely hardware embodiments, entirely software embodiments (including firmware, resident software, micro-code, etc.) or embodiments combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for a called party telephone device automatically identifying a calling party comprising:
   obtaining a first voice message from an identifiable party;
   associating the first voice message with an identification of the identifiable party;
   receiving caller ID information from a telephone service provider along with a second voice message from a calling party, wherein the second voice message is at least a portion of a voice activation command that the calling party uttered to initiate a call to the called party;
   comparing the voice in the second voice message to the voice in the first voice message to determine the identity of the calling party; and
   notifying the called party of the identity of the calling party before the call is answered as determined by comparing the voices in the first and second messages.

2. The method of claim 1, wherein the first and second voice messages are separate instances of at least a portion of voice activation commands that the calling party uttered to initiate calls to the called party.

3. The method of claim 1, wherein the step of comparing includes pattern matching.

4. The method of claim 1, wherein the called party is notified of the identity of the calling party as determined by comparing the voices in the first and second messages, rather than the caller ID information received from the telephone service provider.

5. The method of claim 1, further comprising:
   storing, in a telephony device of the called party, the first voice message and the identification of the identifiable party associated with the first voice message.

6. The method of claim 1, wherein the step of notifying the called party includes displaying the identity of the calling party on a screen.

7. The method of claim 6, wherein the step of notifying the called party further includes displaying an originating telephone number.

8. The method of claim 1, further comprising:
   storing, in a telephony device of the called party, a plurality of records, each record including a voice message and at least one identifier associated with the voice message.

9. The method of claim 8, further comprising:
   receiving a calling party identifier along with the second voice message;
   comparing the second voice message with the voice message that is stored in a target record having an identifier matching the calling party identifier; and
   comparing the second voice message with one or more other voice messages in the plurality of records only if the voice message of the target record does not match the second voice message.

10. The method of claim 9, wherein two or more of the records are associated with a common calling party identifier.

11. The method of claim 1, wherein the step of notifying includes displaying a list of voice messages in a voice mail inbox and the identity of the calling party associated with each of the listed voice messages.

12. A computer program product including computer usable program code embodied on a computer usable tangible medium for a called party telephone device automatically identifying a calling party, the computer program product including:
   computer usable program code for storing a first voice message in association with a calling party identifier;
   computer usable program code for receiving a calling party identifier along with a second voice message;
   computer usable program code for comparing the voice in the second voice message with the voice in the first voice message to determine the identity of party in the second voice message, wherein the second voice message is at least a portion of a voice activation command that the calling party uttered to initiate a call to the called party; and
   computer usable program code for notifying the called party of the identity of the calling party as determined by comparing the voices in the first and second messages.

13. The computer program product of claim 12, wherein the computer usable program code for comparing includes computer useable program code for pattern matching.

14. The computer program product of claim 12, wherein the computer usable program code for notifying includes computer useable program code for displaying an originating telephone number.

15. The computer program product of claim 12, further comprising:
   computer usable program code for storing a plurality of records, each record including a voice message and at least one identifier associated with the voice message.

16. The computer program product of claim 15, further comprising:
   computer usable program code for receiving a calling party identifier along with the second voice message; and
   computer usable program code for comparing the second voice message with the voice message that is stored in a target record having an identifier matching the calling party identifier; and
   computer usable program code for comparing the second voice message with one or more other voice messages in the plurality of records only if the voice message of the target record does not match the second voice message.

17. The computer program product of claim 12, wherein the computer usable program code for notifying includes computer usable program code for displaying a list of voice messages in a voice mail inbox and the identity of the calling party associated each of the listed voice messages.

18. A communication system for a called party telephone device identifying a caller comprising:
   a first telephony device including a microphone for receiving a voice command uttered by a calling party, a component for recording at least a portion of the voice command, a speech recognition module for determining that the calling party is instructing the first telephony device to place a call to a second telephony device, and a component for transmitting the recording of the voice command along with caller identification in an initial call signal;
   a second telephony device storing a first voice message in association with a calling party identifier, and including a voice recognition module for analyzing the transmitted recording to determine the identity of the calling party that uttered the voice command;
   an output device for communicating the identity of the calling party to a called party as determined by comparing the voices in the first voice message and the transmitted recording; and
   a communication network for establishing communication between the first telephony device and the second telephony device.

* * * * *